(12) United States Patent
Cave

(10) Patent No.: US 10,233,784 B2
(45) Date of Patent: Mar. 19, 2019

(54) LIQUID HEATING APPLIANCE

(71) Applicant: Piers St John Spencer Cave, Woking (GB)

(72) Inventor: Piers St John Spencer Cave, Woking (GB)

( * ) Notice: Subject to any disclaimer, the term of this patent is extended or adjusted under 35 U.S.C. 154(b) by 0 days.

(21) Appl. No.: 15/500,311

(22) PCT Filed: Jul. 28, 2015

(86) PCT No.: PCT/GB2015/000220
§ 371 (c)(1),
(2) Date: Jan. 30, 2017

(87) PCT Pub. No.: WO2016/016600
PCT Pub. Date: Feb. 4, 2016

(65) Prior Publication Data
US 2017/0306798 A1   Oct. 26, 2017

(30) Foreign Application Priority Data

Jul. 28, 2014   (GB) .................................. 1413358.1

(51) Int. Cl.
*F28D 20/00*   (2006.01)
*F01K 7/16*   (2006.01)
(Continued)

(52) U.S. Cl.
CPC .............. *F01K 7/16* (2013.01); *F24D 17/001* (2013.01); *F24D 17/0021* (2013.01); *F24D 17/0089* (2013.01); *F24H 7/002* (2013.01); *F24H 7/0241* (2013.01); *F28D 20/0034* (2013.01); *F24D 2200/02* (2013.01); *F24D 2200/14* (2013.01); *F24D 2200/20* (2013.01); *F24D 2220/08* (2013.01); *F24H 2240/09* (2013.01);
(Continued)

(58) Field of Classification Search
CPC ............... F24D 17/001; F24D 17/0089; F28D 20/0034; F28F 2013/006; F28F 2013/008; F28F 2270/00; F28F 2280/10
See application file for complete search history.

(56) References Cited

U.S. PATENT DOCUMENTS

2012/0037337 A1   2/2012   Zillmer

FOREIGN PATENT DOCUMENTS

DE   102008060750 A1   5/2010
DE   102011102138 A1   11/2012
(Continued)

*Primary Examiner* — Jonathan Matthias
(74) *Attorney, Agent, or Firm* — Invention to Patent Services; Alex Hobson

(57) ABSTRACT

A liquid heating appliance for heating water or other liquids, suitably to a target temperature of from 55° C. to around boiling point, includes a primary heat chamber or body (heat source chamber) that is thermally insulated and which in use contains a high thermal density heat storing liquid or solid; and a secondary chamber alongside the primary chamber through which a liquid to be heated is passed in use. The appliance has a heat transfer feature to selectively transfer thermal energy from the heat-storing liquid or solid to the liquid to be heated in the secondary chamber. The secondary chamber is preferably a conduit through which the liquid to be heated is able to flow and the thus heated liquid can be delivered to a tap as hot water for a range of uses. Water may also be heated for a central heating system for space heating.

21 Claims, 5 Drawing Sheets

(51) Int. Cl.
  *F24H 7/00*   (2006.01)
  *F24H 7/02*   (2006.01)
  *F24D 17/00*  (2006.01)
  *F28F 13/00*  (2006.01)

(52) U.S. Cl.
  CPC .. *F24H 2250/10* (2013.01); *F28D 2020/0078* (2013.01); *F28D 2020/0082* (2013.01); *F28F 2013/008* (2013.01); *F28F 2270/00* (2013.01); *Y02B 10/20* (2013.01); *Y02B 10/22* (2013.01); *Y02B 10/70* (2013.01); *Y02E 60/142* (2013.01); *Y02E 70/30* (2013.01)

(56) References Cited

FOREIGN PATENT DOCUMENTS

| | | |
|---|---:|---|
| DE | 102011112600 A1 | 3/2013 |
| DE | 102012000209 A1 | 7/2013 |
| EP | 1962042 A1 | 8/2008 |
| FR | 2811744 A1 | 1/2002 |
| WO | 2997115727 A1 | 10/2007 |
| WO | 2011072880 A1 | 6/2011 |
| WO | 2013114352 A1 | 8/2013 |

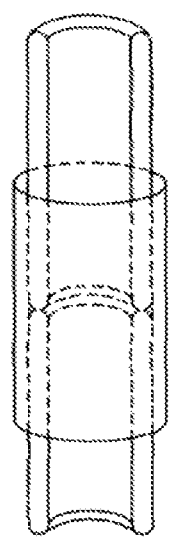
FIGURE 6
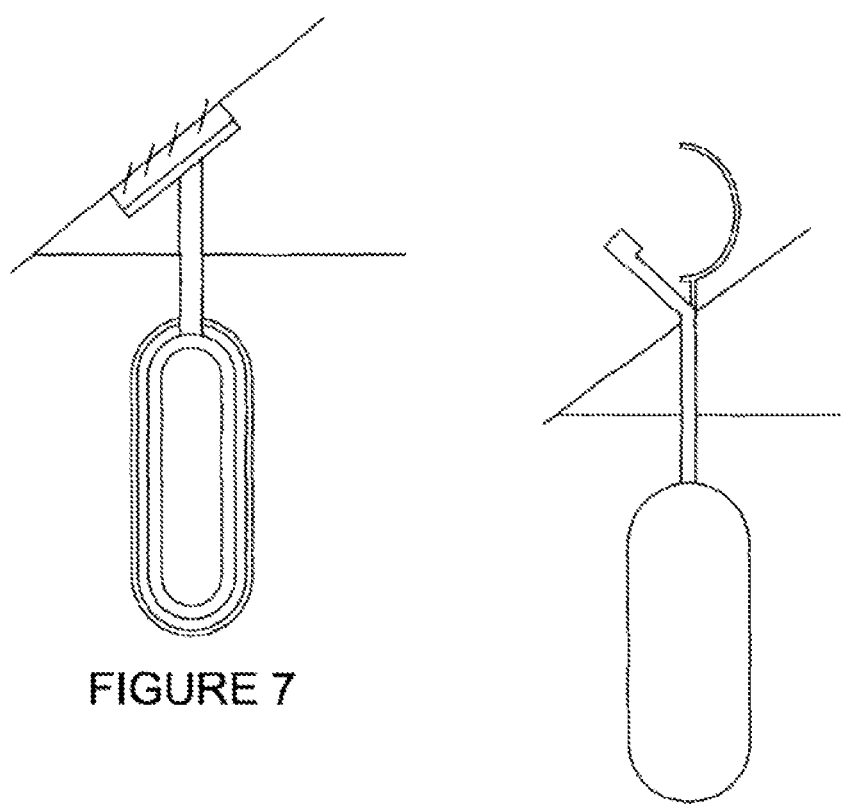
FIGURE 7
FIGURE 8

LIQUID HEATING APPLIANCE

CROSS REFERENCE TO RELATED APPLICATIONS

This application is a national stage entry of PCT application no. PCT/GB2015/000220, having an international filing date of Jul. 28, 2015 which claims the benefit of Gb application no. 1413358.1 filed on Jul. 28, 2014, the entirety of both applications are hereby incorporated by reference herein.

BACKGROUND OF THE INVENTION

Field of the Invention

The present invention concerns improvements in and relating to liquid heating appliances, including systems for heating water or other liquids, whether for central heating of buildings or for hot water delivery/dispensing. Hot water delivered is suitably delivered at high temperatures of from about 55° C. to around boiling point, for example for use for hot beverages, for cooking, washing or for other purposes.

Background of the Invention

Liquid heating appliances for heating water are for the most part generally not pressurised systems but designed to operate at atmospheric pressure or at relatively low pressures of a few bar. Some are operated to heat water to boiling point of 100° C. at atmospheric pressure so that part of the water is converted to steam. The most versatile water heaters are generally electrical water heaters.

Electrical water heaters for central heating of buildings or for hot tap-water or drinks water supply are commonly of a type comprising a main heating chamber for the liquid to be heated and which incorporates within it a high electrical resistance immersion heating element that radiates and conducts heat directly to the surrounding water in the chamber prior to the water then moving on to circulate through room heating pipes or be delivered by pipes to a dispensing tap. On the whole electrical water heaters are relatively expensive and their thermal losses in operation are quite considerable and they do not represent an efficient means for storing or using electrical energy but are used for convenience, compact size and often due to lack of alternatives for a specific location (other fuel sources not available/viable) even though running costs can be high.

Given that we are all to reduce our carbon footprint and all have a strong motive to reduce our energy expenses too in the face of ever-rising cost of fuels for heating, there is as strong need for better water heating options. Electrical water heaters give the greatest flexibility and especially facilitate use of renewable energy, eg from electrical energy harvested from PV arrays or wind turbines et cetera, but fail to store or use the energy to best effect. A more efficient water heater is badly needed.

It is an object of the present invention to provide an improved liquid heating appliance that addresses the energy efficiency problems of the prior art, enabling a given volume of water or other liquid to be heated in the liquid heating appliance with substantially lower energy inputs or better management of energy than in the prior appliances

SUMMARY OF THE INVENTION

According to a first aspect of the present invention there is provided a liquid heating appliance for heating water or other liquids, preferably to a target temperature of from above 51° C. and preferably above to around boiling point, and which comprises: a primary heat chamber (heat storage chamber) that is thermally insulated and which in use contains a heat storing liquid or solid; and a secondary chamber adjacent the primary chamber through which a liquid to be heated is passed in use, the appliance having a heat transfer feature to selectively transfer thermal energy from the heat storing liquid or solid of the primary heating chamber to the liquid to be heated in the secondary chamber. The secondary chamber is preferably a conduit through which the liquid to be heated is able to flow, suitably having an entry valve/gate and an exit valve/gate to control flow therethrough and preferably it substantially wholly surrounds the primary chamber. The secondary chamber may have the form of a pipe that forms a matrix of coil around an outer wall of the primary chamber.

The heat storing liquid used is preferably super heated water or other super-heated liquid, and may comprise molten salt, or may be a solid such as cast iron. The solid or liquid will have high thermal density and for most uses be heated to temperatures substantially in excess of 200° C.

The selectively operable heat transfer feature is particularly preferably a heat conductive material thermal shunt and which preferably is in a wall between the primary heat chamber and the secondary chamber and which selectively operates to thermally bypass the thermal barrier/thermal insulation between the secondary chamber and the primary heat chamber. It may comprise discrete components in the wall that move but preferably comprises movement of the primary chamber or body relative to the secondary chamber through a vacuum to provide thermal contact between the two.

The heat conductive material thermal shunt is preferably a thermally conductive material that is configured to selectively be moved into and out of a position that thermally bridges to the secondary chamber. The thermal barrier is preferably a vacuum flask/vacuum chamber and the thermal shunt is preferably located within this and able to move into and out of position within it. In one embodiment, the thermal shunt is on a rotary spindle and rotates into and out of position. The vacuum flask/chamber preferably is formed with a thermally conductive outer wall so that when the shunt is in position it can transfer energy to and across the wall of the vacuum flask/chamber.

Particularly preferably the selectively operable heat transfer feature comprises an outer wall of the primary chamber or body and an inner surface of the secondary chamber selectively moving relative to each other. Preferably the primary chamber and secondary chamber are configured to move to nest touching or in intimate proximity to each other for thermal transfer or to move apart with a thermal gap vacuum space therebetween thermally insulating them from each other.

Particularly preferably the heat transfer feature is automated or controlled by a controller (eg programmed or responsive device such as a micro-controller controlling a motor) to flip/switch from an inoperative state to an operative state. Preferably it is automated or controlled to switch to the inoperative state once the liquid in the secondary chamber has reached the target temperature.

The heat transfer feature may comprise a thermal shunt that is a more conventional heat exchanger, such as a heat exchange coil tube for the super-heated liquid in the primary heat chamber to flow through, located between the primary heat chamber and the liquid in the secondary heat chamber. Preferably it too is switchable to an inoperative state once the liquid in the secondary chamber has reached the target temperature. It may be pumped or simply rely on convection from its heat to drive flow through the coil. Suitably it is valved to control switching on and off of flow through the coil to allow only enough heat released from the primary chamber to meet target temperature for the water being heated.

Preferably the liquid to be heated is water and the appliance is plumbed to a supply such as mains water supply. The heating of the water fed into the appliance from the water supply is preferably carried out in stages, each stage elevating the temperature of the liquid farther. Preferably there is at least one pre-heating chamber that leads to the secondary chamber. A second pre-heating chamber is preferably further provided between the pre-heating chamber and the primary heat chamber. Preferably a first one of the pre-heat chambers initially raises the temperature of liquid introduced into the appliance and the thus initially pre-heated liquid then passes to the second chamber which elevates the liquid's temperature further prior to it being transferred to the secondary chamber for elevating to the target temperature.

Preferably the appliance comprises an electrical heating element in or proximate to the primary heat chamber. The heating element may be an induction element and if so the heating part can be relatively straightforwardly sited within the primary heat chamber or be sited within a wall of the primary heat chamber. Where the heating element is powered by cables that feed to the heating part it may be preferable to site the heating element outside the primary heat chamber, to avoid compromising the thermal and pressure integrity of the primary heat chamber. In the latter case the heating element is preferably thermally insulated from its surroundings but thermally coupled to the primary heat chamber preferably by a thermal shunt to selectively transfer heat therefrom to the primary heat chamber.

The secondary chamber preferably surrounds the primary chamber on a plurality of sides, suitably as an annular sheath or more preferably fully encompasses the primary chamber and most preferably the primary chamber is substantially centrally positioned within the secondary chamber Where the primary heat storage chamber contains a super-heated liquid, the liquid in the primary heat storage chamber is preferably super-heated to a temperature that is more than double the boiling point of that liquid at atmospheric pressure. It suitably is held in the primary chamber at a pressure of greater than 50 bar to up to 190 bar. Where the heating liquid is water it is preferably heated to greater than 200° C. and preferably to greater than 300° C. up to about 370° C.

The appliance suitably has an inlet for supplying water or other liquid to be heated into the secondary chamber, the inlet being coupled/plumbed to a supply of the liquid—eg to a mains water supply. The liquid supplied is preferably mains water at a pressure of from above 1 bar to about 4 bar to facilitate the flow of the liquid through the appliance and avoid need for a pump or to configure the appliance to cause the liquid to flow therethrough by gravity.

The appliance suitably has an outlet for the heated liquid from the secondary chamber that is gated by a tap or other user-controlled outlet valve to selectively dispense the liquid. The heated liquid dispensed may be near boiling potable water for use in hot beverages or for other purposes. The appliance may deliver heated water at 55° C. or above (safe-guarding against *Legionella*) via plumbing as hot tap water for hand-washing, bathing et cetera or deliver the hot water or other hot liquid into a central heating network of floor-heating conduits, wall-mounted radiators or other space-heating appliances.

The energy coming into the system to heat the primary heat chamber can be mains electricity, peak or off peak or locally sourced electrical energy. The system has smart controls and the potential to store energy as set out later, which renders it extremely suitable to work with smart grids and mains generated alternative energy. It is also be able to benefit from small scale on site solar power (both PV and hot water). In a variant of the appliance a thermal shunt may be provided to direct heat back into the primary heat chamber from a super heated copper plate.

Amongst major benefits of the appliance are its ability to store a large amount of thermal energy in a small container that can be located very close to the tap or appliance that uses the hot water/liquid. It is possible to store the equivalent amount of energy in a 2 liter inner pressurised vacuum flask/primary heat chamber as in a normal domestic hot water cylinder at 55° C. that is of many times that capacity. This will save energy from avoiding long pipe runs that lose heat and to store energy from the sun until required for use. It will also save water by avoiding having to run the tap for a prolonged period to get the correct temperature water out. The appliance also provides the added convenience of instant hot water at the tap. With the energy being stored in the form of super heated water in a vacuum flask the energy can be stored for a long time which is extremely important with alternative energy systems.

The system may be used on a large industrial scale to store thermal energy in super heated liquid. The thermal energy can come from prior generated electrical energy or other energy sources, whether from renewable energy sources or otherwise, and it can be released when required to heat water or other liquid. The heated water can if desired be heated up to boiling to produce steam that will then power an electricity producing turbine, thereby converting the thermal energy to/back to electrical energy. In this latter case, though converting energy from electrical form to thermal form and then back to electrical form involves losses, the system nevertheless has only limited heat energy losses and is a far better alternative to having no storage and is better than or more versatile than relying on one of the existing low efficiency or location-restricted energy storage alternatives currently relied upon (such as the hydro-electric power plants of the dams of North Wales that are used to store energy for the UK National Grid). The system of the present invention can be used with its smart energy management to store surplus National Grid electrical energy (or indeed electrical energy from local renewable sources or thermal energy from solar water heating panels or other sources) as thermal energy of super heated liquid in the primary heat chamber. This storage is highly efficient and space-efficient and the energy can be used for hot-water or space heating or may then be converted back to electrical energy on demand via the generation of steam from the appliance and which is used to drive a steam turbine to generate electricity.

The secondary chamber is thermally insulated and selectively substantially shielded from direct heat transfer relationship with the primary chamber. A thermal barrier is positioned between the two. This barrier enables heat to be stored in the primary chamber and allows release of heat from within the primary chamber to be carefully controlled to meet demand for heating the liquid in the secondary chamber to the target temperature without squandering the heat.

Preferably the appliance has a casing housing its chambers and which is adapted to provide good insulation. The insulation of the casing may comprise a cellular or foam lining. Preferably there is an air gap between the casing and the chambers. Furthermore, the casing may have a heat reflective interior to reduce loss of heat. The walls of the pre-heating chambers and especially those that surround the boiling chamber are preferably formed as vacuum flask/vacuum chamber walls, suitably of stainless steel with a partial vacuum within.

Preferably the heating element for the primary chamber and any further heating elements for pre-heating chambers, if present, draw electrical energy from external recovered/l harvested energy sources including from solar/PV panels. The one or more heating elements of the appliance may be directly powered resistance heating elements/coils or may be inductively powered heating elements, the appliance being an electric powered appliance. For greater control of operation beyond simply having a power-on switch for energising the heating element(s) and a thermostatic regulator to cut off power when the target temperature point is reached, the appliance may further include one or more flow control regulators/valves/controlled closure means to control the flow/rate of flow through the secondary chamber. The appliance is preferably configured to close fully or partially the flow exit from the secondary chamber, to allow dwell time for the liquid in the chamber to be heated sufficiently before passing to the next chamber. Also, in particularly preferred embodiments of the invention flow between the secondary chamber and the inlet feeding into it may be blocked by a flow control barrier to prevent any back-flow or other disruption to the heating phase in the secondary chamber.

The appliance may have selector switch means that enable selection between heating a high volume of liquid in the appliance that is greater than the volume in just one chamber or heating a single chamber volume, ie which selects between power up/supply of heating means in just one of the chambers or power up/supply of heating means in two or more of the chambers.

In an important further aspect of the invention the appliance has a processor or controller that is programmed to control the appliance to manage operation of the appliance's use of energy. The processor or controller is preferably programmed with one or more predictive algorithms to predict and thence control the appliance to manage operation of the appliance's use of energy and minimise demand spikes or enable the appliance to be pre-heated or boiled for predicted demand. Preferably the processor or controller is programmed to control the appliance to manage operation of the appliance's use of energy to be pre-heated when surplus electrical energy is available or when need is fore-cast.

BRIEF DESCRIPTION OF THE DRAWINGS

Preferred embodiments of the invention will now be more particularly described, solely by way of example, with reference to the accompanying drawings in which:

FIG. 6 is a simple schematic diagram of a vacuum-ensheathed pipe and a connector sleeve;

FIG. 7 is a simple schematic diagram showing the appliance mounted to/coupled to pipes of a solar hot water array; and FIG. 8 is a simple schematic diagram showing the appliance integrated into a solar PV array.

DESCRIPTION OF THE PREFERRED EMBODIMENT

Figure 1:
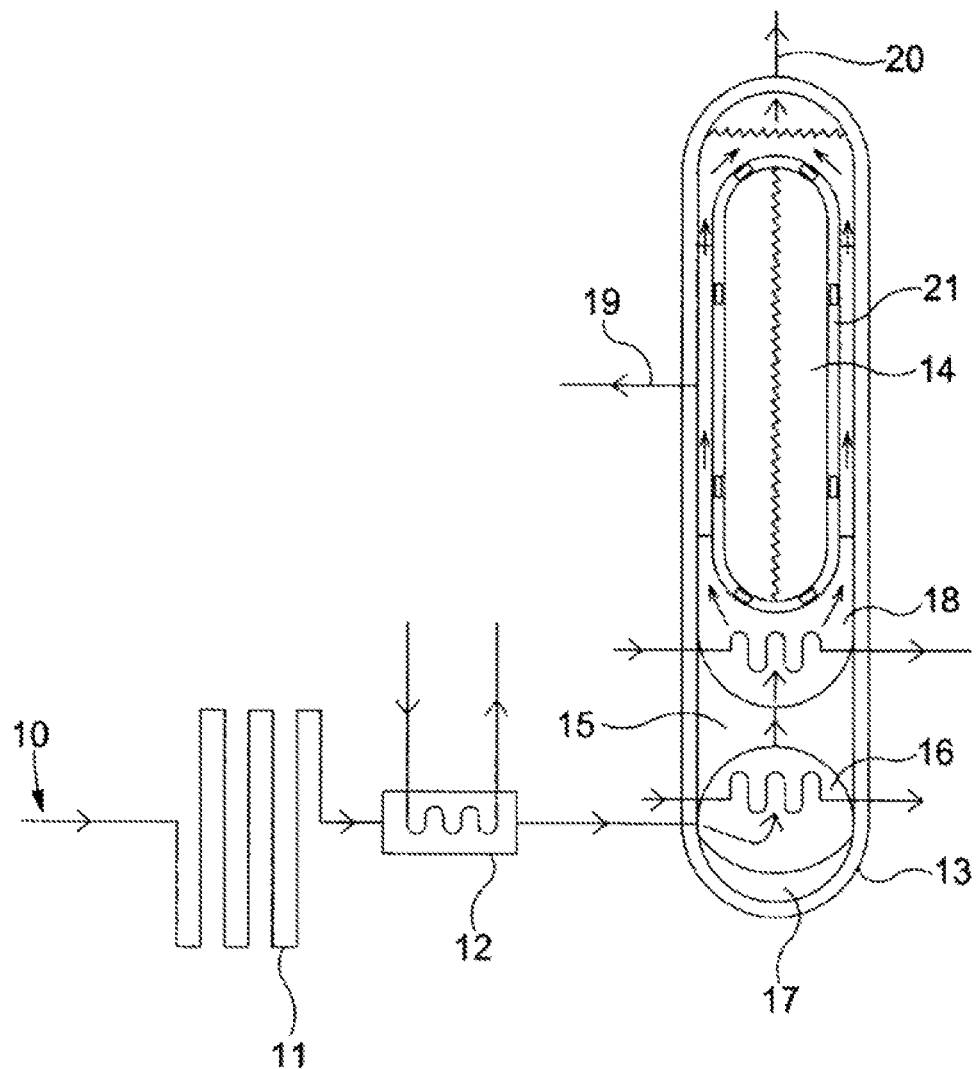
FIG. 1 is a schematic transverse sectional diagram of a preferred embodiment of the present invention.

Referring to FIG. 1, the illustrated embodiment of the appliance is a plumbed system that receives incoming pressurised cold water from a mains water supply. The mains water supply will commonly be at a pressure of between 1 and 4 bar and by virtue of that pressure is driven through the system without need of pumping. The water flows through the system from the inlet 10 (at the left end of the system as illustrated) to the outlet 20 (at the top right hand end as illustrated). The cold water entering the system at the water inlet 10 first passes through a non-return valve to enter an aerial heat exchanger 11 of high external surface area (suitably with plates or fins and similar to a radiator) and which serves to warm the water passing through it to around the ambient room temperature of the room in which the system is installed. The aerial heat exchanger 11 has below it a drip tray for any vapour in the room condensing on it, the drip tray having a surface area sufficient to catch all run-off and ensure evaporation without the need to empty the drip tray manually.

Next the warmed water passes into a fluid heat exchanger zone 12 to further pre-heat the inflowing water. This heat exchanger 12 suitably serves to use scavenged waste heat from warm waste water or other warm sources in the building. It may, for example, harvest heat from kitchen sink or bath water, picking up heat from washing machines/dishwashers (possibly even from ovens, fridges et cetera). The heat exchanger 12 will only be activated if the waste water is at a greater temperature than the water flowing through the system.

Next the further warmed water passes into the main body of the heating appliance. The main body of the heating appliance has an insulated outer casing 13 which is suitably formed as a vacuum chamber to minimise heat losses. The outer casing 13 is suitably cylindrical and houses at its core a thermally insulated and pressure-retaining primary heat chamber 14 for storing thermal energy in super-heated liquid. The primary heat chamber 14 is surrounded by a secondary chamber 15. The secondary chamber 15 is the chamber/conduit through which the pre-warmed water is passed to heat it to its target temperature.

The secondary chamber 15 within the outer casing 13 is, in this illustrated embodiment, divided into 3 separate chambers/sub-chambers 15a, 15b, 15c that will each heat the flowing water respectively to an ever higher temperature as it flows therethrough. The first chamber/sub-chamber 15a heats the water to a temperature of from 30° C. to 50° C. suitable for space heating. The second chamber 15b heats the water further to between 55° C. and 60° C. to serve as normal tap hot water above the *Legionella* risk temperature of 51° C. There will be a separate outlet from this chamber 15b. The third chamber is where the water passing through the chamber 15 will be heated further to reach its substantially ultimate maximum temperature of, for example, 70° C. or even approximately 100° C. for use as a boiling water tap or as steam if used to drive a dynamo et cetera.

The pre-warmed water thus flows into first chamber 15a within the casing 16, which may be a first sub-chamber 15a of the secondary chamber 15. This first chamber 15a is suitably an accumulator having a diaphragm 16 that ensures that the water pressure within the main volume of the secondary chamber 15 is constant and absorbs any pressure fluctuations. There may also, as illustrated, be a heat exchanger 17 in this first chamber 15a carrying heated water from a solar hot water system if present and working to further pre-heat the warmed water. The heat exchanger in the first chamber or sub-chamber 15a within the casing 13 can alternatively serve as a heat exchanger for a low to medium temperature space/central heating circuit working between 30° C. to 50° C. if required.

The heated water then flows from first chamber 15a within the casing 16 to second chamber 15b within casing 16, where it may be heated by a yet further heat exchanger 18 to a temperature of above 51° C., preferably of from 55° C. to 60° C. to produce normal tap hot water dispensed through a separate outlet 19 from the chamber.

The heated water then flows from second chamber 15b within the casing 16 to the third chamber 15c within the casing 16. The third chamber is where the water may be heated by heat transferred out from the Primary heat chamber 14 to raise the temperature of the water to the target of approximately 100° C. for a boiling water tap. In another variant, the system is primarily a space-heating and hot water system with up to 60° C. water coming out of the main outlet 20 (near the top in FIG. 1) rather than boiling water. A near boiling water tap/outlet may in that case, if desired, be provided instead as an optional additional feature and may be provided external to the secondary chamber optionally at an additional external chamber of the appliance.

Figure 4:
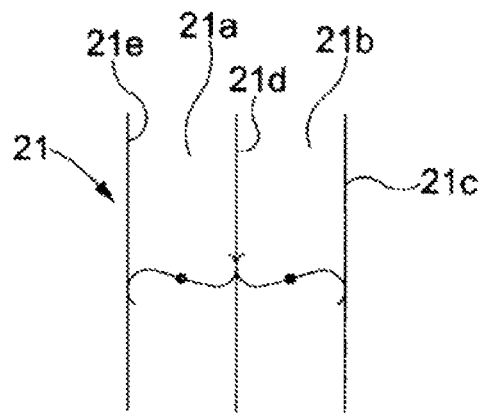
FIG. 4 is a simple schematic diagram showing a twin-walled configuration of the primary heat chamber and with a pair of thermal shunts in series to complete the thermal transfer there-across.

The primary heat chamber 14 is defined by an envelope/sidewall 21 that is formed as a vacuum flask. It may for greater energy storage efficiency, as per FIG. 4, have a double thick envelope/sidewall 21 construction comprising an outer vacuum zone 21a and inner vacuum zone 21b defined between inner 21c, intermediate 21d and outer 21e walls, for very high insulation levels.

The inner wall 21c of the primary heat chamber 14 is suitably lined with glass or special alloys or other corrosion resistant treatment/material. The electric heating element 22 for the primary heat chamber 14 is suitably held in a thermally insulated capsule 22a and is preferably housed within a/the vacuum zone 21a, 21b of the vacuum flask wall of the primary heat chamber 14 outside the innermost wall 21c of the primary heat chamber 14. In a further variant, it might be positioned seated against the outer wall 21e and configured to transfer heat through to the interior of the primary heat chamber 14. The heating element 22 is suitably thus within the vacuum and will have a radiant guard/thermal guard over it or is embedded in the chamber wall. Either arrangement avoids or minimises the extent that power cable for the heating element 22 needs to penetrate the pressure resistant thermally insulated walls.

Once the liquid, preferably water, within the primary heat chamber 14 is heated by electric heating element 22 to the required temperature and pressure—eg for water to super-heated state optimally of approximately 370° C. and 190 bar—it is at its optimal thermal energy storing state.

Heat can then be selectively transferred from the primary heat chamber 14 to the secondary chamber 15 that surrounds it when required to heat the water flowing in the secondary chamber 15. This is achieved by means of a plurality of heat transfer shunts TS in the side wall/elongate capsular envelope 21 that delimits the primary heat chamber 15. Each heat transfer shunt TS is adapted to be actuated to move to make contact with the innermost and outermost walls of that sidewall creating a thermal bridge between them spanning the vacuum void between the innermost and outermost walls of the sidewall/envelope 17.

Figure 2A:
FIGS. 2A and 2B each show schematically the switchable thermal shunt in the thermal barrier wall between the primary heat chamber and the secondary chamber, with FIG. 2A being in the inoperative state and FIG. 2B being in the operative state for transferring heat across the barrier wall.
Figure 2B:
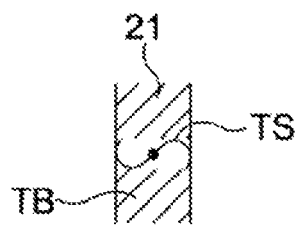
Figure 3:
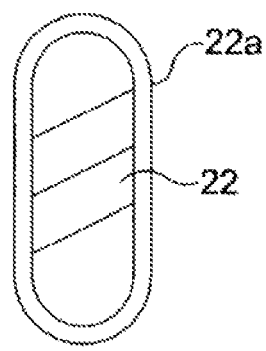
FIG. 3 is a simple schematic diagram showing an encapsulated heating element that is thermally insulated from its immediate surroundings and which may be selectively placed in heat transfer arrangement to the primary heat chamber, suitably in the wall of the primary heat chamber.

Each thermal shunt TS, as shown in FIGS. 2A and 2B suitably comprises a linked pair of thermally conductive contact arms projecting from opposing sides of a spindle and with the spindle adapted to rotate by 90° from an operative to an inoperative position of the shunt TS and back in response to an actuating movement or signal. The actuation may be controlled electrically, mechanically or magnetically, for example, and suitably is under processor and/or negative feedback control to determine when to allow transfer of heat, for how long and when to stop the transfer. The temperature of the water in the secondary chamber 15 is sensed and the transfer of heat from the primary chamber 14 is shut down when the target temperature is reached. In the double-vacuum variant of FIG. 4 there is a respective thermal shunt TS in each vacuum zone 21a, 21b with the shunts TS aligning in series when actuated so as to transfer heat fully across the envelope 21 of the primary heat chamber 14.

As a fall-back for when the inner heating chamber falls low on heat in the primary chamber 14, or if on an occasion it is more efficient to use it, the third chamber 15c of the appliance suitably further has an auxiliary electric heating element within it that may be mains electricity powered (on-peak if needs be) to boost the temperature of the water to the target temperature before it leaves the appliance.

Since the system and especially the primary heat chamber 14 contains high pressure and temperature liquid that is highly corrosive, the chambers of the system are particularly preferably formed or treated to counter risk of corrosion. Suitably they are fabricated of stainless steel. Particularly preferably the primary heat chamber 14 has an inner lining of glass, or a special alloy or other treatment or corrosion resistant material to mitigate against the highly corrosive effects of the super heated water or molten salt therein.

Figure 5:
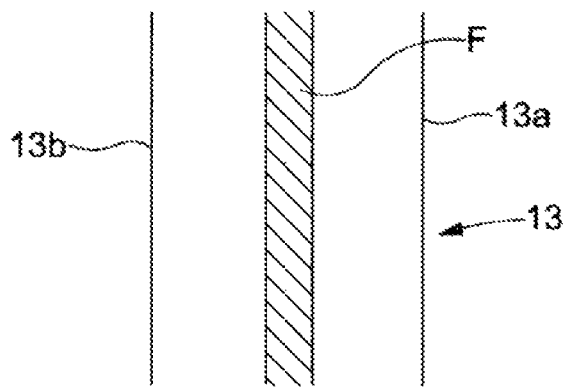
FIG. 5 is a simple schematic diagram showing a twin-walled insulated sandwich configuration of the outer wall of the secondary heat chamber and/or of the external body casing of the appliance.

Referring to FIG. 5, the appliance outer casing 13 is well-insulated and preferably is twin-walled but with a layer of rigid foam F sandwiched in the middle between inner and outer walls. Further insulation improvements to the system may include thermal insulation of the pipe-work outside the casing 13. FIG. 6 shows a vacuum insulated pipe to ensure the hot (or cold water) exiting the system remains at the correct temperature up to the tap. A connector sleeve may cover the join between vacuum insulated pipe sections as shown. The vacuum-insulated pipe may extend right into a special tap to ensure that it is vacuum insulated up to the valve.

Turning to FIG. 7, this shows the appliance mounted and coupled to a solar hot water system. The solar hot water system could be a modified system that incorporates one or more directional lenses or mirrors to heat a copper flat plate to very high temperatures and the system then conduct the heat via a solid copper link into the primary heat chamber 14 through a/the thermal shunt (the shunt TS acting in reverse to the direction for releasing heat energy from the store within the primary heat chamber 14. The control mechanism for the array will ensure the copper plate does not overheat by moving the mirror or lenses over the plate and if necessary stooping the heating. This could be located directly above the cylinder 13 allowing the physical copper link into the cylinder via the thermal shunt to conduct the heat into the inner chamber.

Referring to FIG. 8, a substantially conventional solar PV array/system could be used to provide additional electricity to heat the system conventionally with the electric resistance elements. It will be beneficial to have the PV panels as cheap and efficient as possible. The best way of increasing the efficiency of solar panels is to move them to track the sun. Dual axis movement systems already exist with expensive motors controlling individual panels. However, an innovative approach to achieve this can be to have a row of solar panels centrally hinged and moved in the horizontal axis with a single electric motor via cables, pulleys or connecting bars. They could be moved in the vertical axis with a cam at the top of the panel that will control the angle and again the whole row will be connected so a single electric motor can move the entire row. A further unique feature may be an arrangement whereby the length of the lever that controls the horizontal movement varies very slightly along the row to ensure the angle is slightly different for each panel to ensure it is pointing directly at the sun—this will be relevant if the row is very long, eg maybe several hundred meters in a commercial application.

If enough energy can be stored safely in a large enough cylinder the heat from the primary heat chamber 14 can be released into another chamber to heat water to produce steam under pressure—this in turn could drive a small steam turbine to produce electricity therefore storing the energy of the sun during the day and then releasing it to produce electricity overnight or at a later date when the sun is not shining. This will have another benefit of condensing the steam that has gone through the turbine to produce clean drinking water.

The same technique could be used to store the temperature from a solar hot water system at a much higher temperature than currently. It could also have potential as a water cooler to provide instant cold water at the tap with the primary chamber containing a coolant rather than a heating medium and which will receive inward heat transfer via thermal shunt to cool the water flowing past.

The main benefits of this system is that it can store a significant amount of heat in a comparatively small cylinder that will fit easily in a kitchen cupboard so it will be close to the tap thereby saving energy and water when you run a tap to get to the desired temperature. It will also be able to store heat for a long time so it can work with alternative energy sources and it will have controllability. Key aspects of intelligent control include weather forecasts (sun and wind in particular) several days in advance and predicting its useage over the same timescale to decide when it boosts the temperature in the inner chamber. It might be efficient to locate one unit in the kitchen and a second unit in the bathroom (this will also power the $1^{st}$ floor heating circuit).

As previously described the system can also use the bath or kitchen sink waste water via heat recovery to pre heat the incoming cold water supply and potentially even the oven in a kitchen could be used to harvest waste thermal energy and also plumbed into the heat recovery elements of the system. In turn the dishwasher and washing machine could come on at the correct time to use the surplus waste heat from the oven/sink.

The appliance as described and illustrated with reference to FIG. 1 can assist with power demand management. The appliance has the ability to store hot water that can be pre-heated ahead of need and kept from giving out its heat until the heat is required, and limiting the heat release to only so much as is required. The appliance can be a smart connected appliance and can form part of a smart local or national electricity power supply net-work/grid. Heating times can be staggered in response to central control, feed-back or through programming to reduce local or national electricity grid overload.

When excess energy is generated from local Photo-Voltaic (PV) arrays or other local renewable electrical energy sources the appliance can pre-heat and act as an energy store so that even if there is no means of storing or using the electrical energy elsewhere it may be saved. The energy from a Photo-Voltaic (PV) array or other local renewable electrical energy source can be directed to the heating element for the primary heating chamber and/or to a further heating element in a pre-heating chamber.

The system can even be used to thermally store energy from other renewable electrical energy sources such as from tidal and ocean currents or to store energy from ground or air source heat pumps.

As a smart appliance the appliance can be remotely but manually controlled to switch on from a smart phone, tablet or computer. Such devices via an app can also be used to programme the appliance to preheat/boil at opportune moments such as when a TV programme break is approaching or when the home-owner is close to arriving home, getting up in the morning etc. Inputs can be sourced from a TV box, GPS location device, car Sat-Nav, computer internet use, an alarm clock, an Outlook diary, a burglar alarm, PV solar panels, local weather station, national weather forecast or even a national smart grid central control for optimum efficiency.

Artificial intelligence can also be used to predict and learn when the appliance is likely to need to be used and therefore preheat. This could be based on a programme that takes inputs from the above sources and learns a daily routine and will understand when it varies from the use of other gadgets and location. The accuracy will improve over time as it learns from the actual use compared to predicted use. This will result in the water being pre-heated to reduce heating time when the hot water is required for use and to phase the pre-heating switch on time to coincide with fore-cast use or coincide with availability of excess energy sources (such as from PV panels) or to reduce the number of appliances switched on at precisely the same time nationally.

Amongst the different levels of smart control that the appliance may afford are: remote manual control; timed & programmed control; reacting to an input from another device when programmed (such as a signal from an alarm clock or signal from disabling of a burglar alarm); reacting to an input from another device automatically; Artificial Intelligence having a processor programmed with one or more predictive algorithms to predict likely or suitable switch on times; and external control to pre-heat therefore phasing appliance switch on times (as part of national grid demand management).

From the fore-going description and the illustrations it will be appreciated that the appliance of the present invention has exceptionally high efficiency, reducing its energy use for water heating needs and it effectively stores energy. In doing so, it also helps to flatten spikes in energy demand that are energetically costly to the electricity provider (whether the provider is a local or national grid or a small-scale local renewable energy source of intermittent type such as a PV array or wind turbine). The benefits in flattening spikes in energy demand are further enhanced by making the appliance into a smart appliance with microprocessor control that can, predictively or in response to feed-back, stagger boiling times to mitigate against spiking. The appliance can have connectivity to other gadgets such as smart phone and TV along with intelligent learning functions allows for its full integration into a smart connected home.

The design of the appliance enables waste energy to be captured, stored and re-used minimising power demand spikes, reducing heating time to reach target temperature, reducing energy use and carbon emissions. Further efficiencies can be gained by linking to renewable energy devices in view of the appliance's ability to serve as a store of thermal energy. Despite all of these considerable advancements the appliance is simple to use just like a normal heated water appliance. The user has access to near-boiled tap water on demand at the outlet tap of the appliance or heated water delivery to radiators of central heating or of target temperature hot water to taps for bath, sink or shower as required.

Suitably the system has safety devices to prevent any serious problem in the unlikely event of a pressure vessel failure. A pressure relief vessel/means may be provided, suitably having a pressure valve with a pipe outlet to outside a property to vent escaping superheated water/steam. Also the system may be provided with an ability to open the thermal shunts and pass cold water over the inner chamber to cool it down—this will have an outlet directly into a kitchen sink or bathroom wash hand basin waste pipe to avoid scalds as this water will be heated by flowing over the inner chamber.

Figure 9:
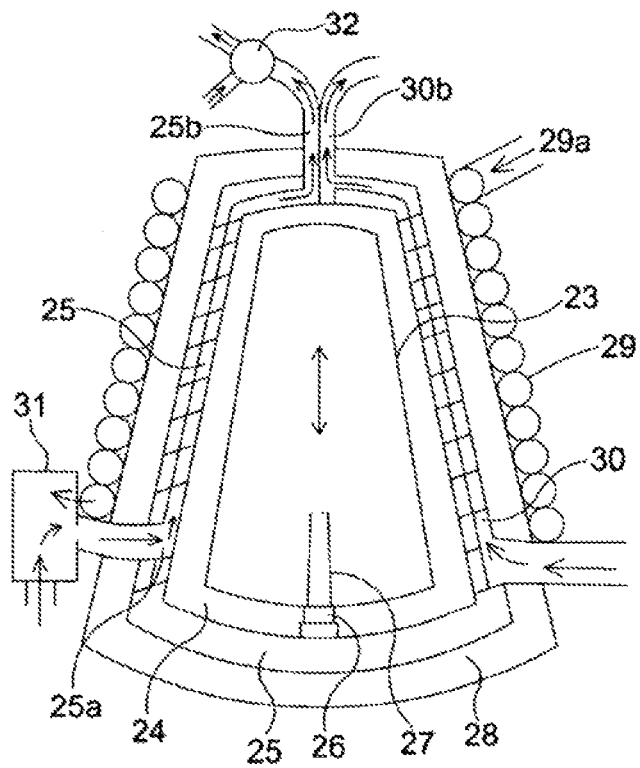
FIG. 9 is a schematic sectional diagram of a preferred embodiment of the appliance having a thermal shunt arrangement wherein the heat storage primary chamber and secondary chamber move relative to each other to switch between heat storage and heat transfer states.

Referring to FIG. 9, this shows an improved form of the appliance in which the switchable thermal shunt arrangement for transferring thermal energy from the primary chamber/heat storage chamber to the flowing liquid in the secondary chamber is not a set of discrete thermal shunt elements in the wall of the primary chamber but rather is defined by the primary and secondary chambers themselves being movable relative to each other. This can enable a selectively much higher rate of thermal transfer from the heat store to be implemented to be able to heat water flowing passed at high rate and better satisfy high instantaneous demand for heated water. As with the embodiment of FIG. 1, the primary/heat storage chamber 23 is housed within the secondary chamber 25.

The primary chamber 23 holding the heat storage medium, which here preferably is molten salt, is directly surrounded by a vacuum space 24, thermally insulating the primary chamber 23 from the secondary chamber 25. When required to transfer heat from the primary/heat storage chamber 23 to the secondary chamber 25 the two are moved into contact, or very close proximity to thermally bridge the vacuum gap 24. The primary chamber 23 has a substantially conical/frusto-conical form that is received within a correspondingly shaped recess/void defined by an inner wall of the secondary chamber 25 that surrounds/en-sleeves the primary chamber 23. When the narrower end of the primary chamber 23 is moved deeper into the narrowing conical recess of the secondary chamber 25 (upwardly in FIG. 9) a large area of the conical wall surface of the primary chamber 23 comes into contact with the opposing conical inner wall surface of the secondary chamber 24.

Figure 10:
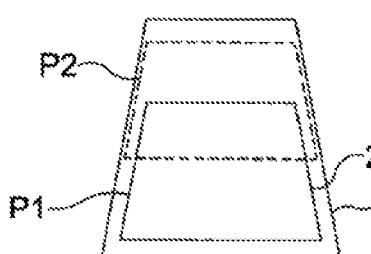
FIG. 10 is a diagram showing the upper and lower positions of the primary chamber as it moves between heat storage and heat transfer states.

FIG. 9 is schematic only, illustrating the overall system, and does not show the relative scales of the primary 23 and secondary 25 chambers and the vacuum gap between them. FIG. 10 better illustrates their respective positions, showing the start position at P and the end position at dotted line P2, the end position P2 being the position where there is the contacting fit of the outer conical surface of the primary chamber 23 within and against the inner conical surface of the secondary chamber 25 when the primary chamber 23 has moved upward in the secondary chamber 25. The upwards movement of the primary chamber 23 will be of the order of only 5 to 10 mm in most cases. A vacuum gap of that width is normally adequate to provide good thermal insulation. The movement is here driven by a drive mechanism comprising a drive piston 26 that extends from the lower inner wall of the secondary chamber 25 through the vacuum gap 24. The drive piston 26 carries at its upper end an immersion heating element 27 for heating the molten salt in the primary chamber 23. In addition or alternative to drive piston 26, the mechanism for moving the primary heat chamber or body 23 may comprise an electric motor with rack and pinion or geared rotating spindle or comprise magnets or indeed other driving means could be used. To assist the drive mechanism to raise the primary heat storage chamber or body 23 a counter balance or spring is particularly preferably provided, minimising the input energy required to drive the motion. Thermal breaks are suitably also provided to reduce the heat transmission through the drive mechanism. The drive mechanism may even disengage/physically uncouple when it is retracted to reduce any heat losses yet further.

The secondary heat chamber 25 here is a sheath comprising a matrix of ducts, or in a less refined form a coil of pipe, through which the water to be heated flows and which ensleeves/encircles the primary chamber 23. The illustrated secondary heat chamber 25 in FIG. 9 is a thin matrix-form water jacket that surrounds and encapsulates the primary chamber 23 and vacuum gap 24. The water jacket shown is suitably formed by a twin-walled tubular sleeve where the narrow space between the twin walls is partitioned by spiralling vanes to define a spiralling duct or a manifold of spiralling ducts that maximise the dwell time and total thermal transfer area that the water is exposed to as it passes through the water jacket. The water jacket ducts may be designed to have equivalent cross-sectional area to pipe of the order of 15 mm but in a much more compact and dense manner and providing for much more efficient heat take-up.

In the illustrated embodiment of FIG. 9 the secondary heat chamber 25 is immediately surrounded by a tertiary heat chamber 30 that is hereshown as a contiguous substantially identical outer water jacket of matrix of ducts that is integrally formed/assembled on the exterior of the secondary heat chamber 25 water jacket. This outer water jacket/tertiary heat chamber 30 indirectly receives heat from the heat store of the primary chamber 23 as some conducts through to it from the intimately associated outer wall of the secondary heat chamber 25. Indeed, the outer wall of the primary chamber 23 may be the inner wall of the tertiary heat chamber 30.

The heated water from the secondary chamber 23 will suitably be heated to about 55° C. for use as hot tap water. The water flowing through the tertiary chamber 30 is completely separate from the water flowing through the secondary chamber 23 and will generally be heated to a lower temperature than the water in the secondary chamber 25 and be used for a space heating/central heating circuit, delivering heat from outlet 30b to the pipes of the radiators or under-floor heating array, for example, delivering the heated water at about 35 to 45° C. The temperature may be controlled by the pump that controls the water flow through the tertiary chamber 30.

The double water jacket comprising the secondary chamber 25 and tertiary chamber 30 is itself housed within an outer vacuum chamber 28 that limits any heat loss from the appliance. The outer surface of the outer vacuum chamber 28 is further ensheathed by an aerial heat exchanger water circulatory sheath 29 comprising a matrix of conduits or coil of pipe that spirals down the outer wall and carries water to be heated. This aerial heat exchanger 29 takes up ambient heat of the surrounding air when the air temperature is relatively warm as well as recovering any heat that might leak from the outer vacuum chamber 28. Cold water enters the aerial heat exchanger 29 at the upper inlet 29a and exits by a waste water heat exchanger unit 31 near the foot of the appliance to then be directed through inlet 25a up through the inner matrix/coil of the secondary chamber 25 to outlet 25b, heated to the required tap water temperature of, for example, 55° C. A thermostatic mixer valve 32 at the outlet 25b can be used to down-regulate the temperature of the output water by selectively mixing it with cold water to ensure that the output water is not over-hot. A special thermally resistant valve is used on the hot water outlet to ensure that the thermal heat loss from the appliance through the pipe-work is minimised. A thermally sealed non return valve is also preferably used on the cold water inlets 25a, 29a.

Figure 11:
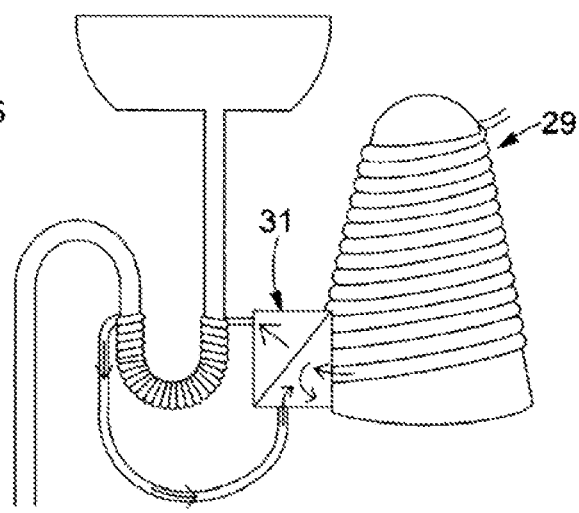
FIG. 11 is a diagram illustrating in more detail the waste water heat recovery arrangement of the FIG. 9 system.

The waste water heat exchanger unit 31 selectively operates to further pre-heat the water from the outer water circulatory sheath 29 before it enters the matrix/coil of the secondary chamber 25, scavenging heat from external heat sources such as a basin, bath or shower outflow. This is illustrated in more detail in FIG. 11, in which the water from the outer sheath 29 is selectively diverted through the waste water heat exchanger unit to pass through a heat exchanger pipe coil 32 ensheathing the waste pipe of a basin if that pipe is sensed to be warmer than the water to be heated, before re-joining the water flow back into the inlet 25a of the secondary chamber 25. The selective operation of the heat exchanger unit 31 avoids diversion through that heat exchanger if the waste pipe is cold.

Figure 12:
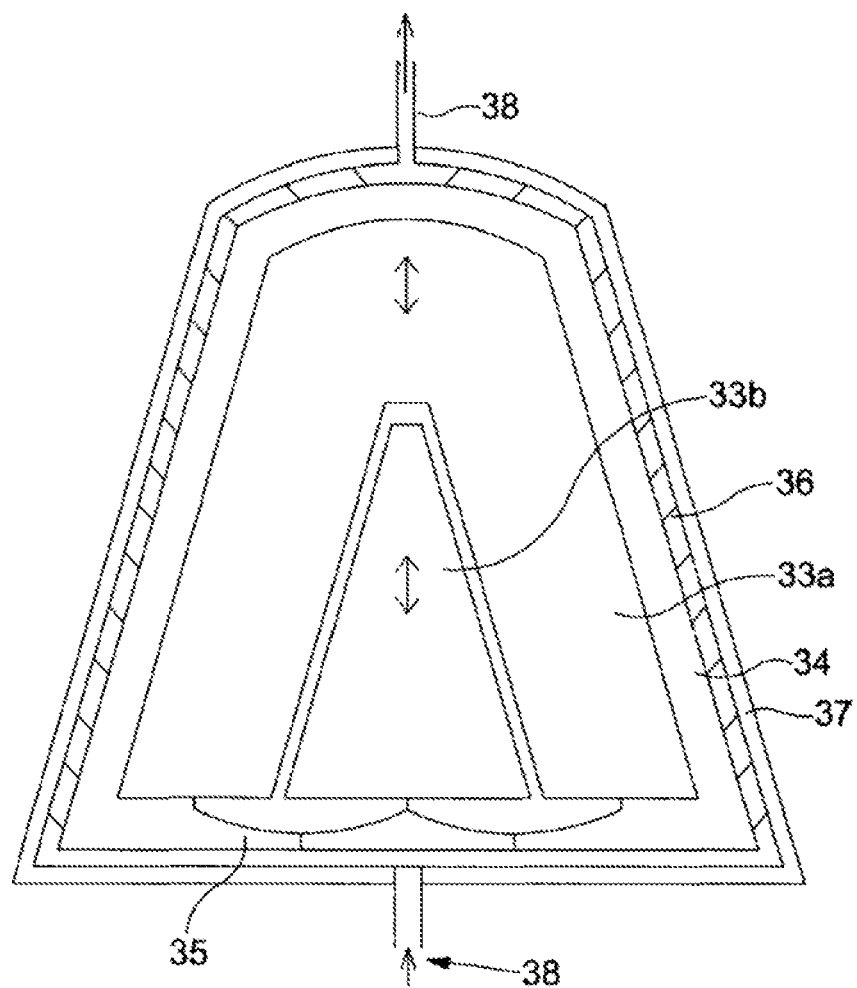
FIG. 12 is a schematic sectional diagram of a further preferred embodiment similar to that of FIG. 9 but where the primary heat storage body is a solid core of cast iron and is in two parts that are counter-balanced to reduce the energy requirement to move the heat store to contact the secondary chamber.

Referring to FIG. 12, this shows a version of the appliance where the primary heat storage body is a solid core of cast iron 33 that is in two parts: an upper outer part 33a; and an inner, lower 33b. The two parts 33a,33b are counter-balanced to reduce the energy requirement to move the outer part 33a of the heat storage body 33 into contact with the secondary chamber 35 bridging/closing the inner vacuum chamber/vacuum gap 34 between the heat storage body 33 and the secondary chamber 35. In this embodiment the drive mechanism for the thermal shunting motion is preferably a worm drive moving a circular piston.

The counter-balanced core parts 33a, 33b are each on pivotted lever balances 35 to counter balance each other. They are almost equally balanced so that the effort required to move them for the upper part 33a to make contact with the vacuum chamber outer wall/inner wall of the secondary chamber/water jacket 36 is almost zero. At rest they will be in contact with each other and having no contact with the vacuum chamber wall/water jacket 36. When the thermal shunt is required to operate the inner core part 33b will pivot down and the outer/upper core part 33a will move up to make contact with the vacuum chamber wall/water jacket 36. When the drive disengages the inner core part 33a will move up and the outer 33b comes down and they will share thermal heat between them with contact with each other. They may both have heating elements or the lower part 33a alone may have a heating element.

Instead of full balancing, one part 33a or 33b may be slightly heavier than the other so that gravity will enable them to rest in a disengaged position. Furthermore although illustrated with two lever balances 35, there may be three lever balances in the base to hold them in place securely. The lever balances 35 are thermally insulated, suitably with ceramic pads or the like.

The secondary chamber water jacket 36 here suitably has the same matrix construction as in the FIG. 9 embodiment and may have a contiguous tertiary chamber matrix around it as in the FIG. 9 embodiment, though not illustrated as such here. The water matrix/water jacket may have several layers where the water spirals up and down the full length of the body twice or more if it takes longer than anticipated to heat up to the required temperature. External to the secondary chamber water jacket 36 is the outer vacuum chamber 37 insulating the appliance against any low level heat losses.

Preferably the cold water inlet 37 is provided with an accumulator to equalise water pressure and the hot water outlet 38 has a mixer valve, as in the preceding embodiments, to mix the out-flowing heated water with cold water if it exceeds a safe/pre-determined limit temperature.

Where cast iron is used for the core 33 it may be surrounded by a stainless steel jacket (or other reflective coating) to reduce radiant heat loss and thermal insulation may also be provided between the stainless steel jacket and cast iron core to slow the heat transfer if too much heat is lost through the vacuum 34.

An insulated thermal break is again suitably provided on the hot water outlet 38 from the appliance to prevent heat losses from the heated water and this is particularly important if situated directly by a hot water tap.

In a further detail to the waste heat recovery aspects of the invention, the system that harvests waste heat from an oven referred to earlier could work by having internal heat exchangers in the oven that are oil filled as a heat transfer medium. A dedicated vacuum shunt mechanism of equivalent form to that described for the appliance can be built into the oven and have an oil matrix that is linked to the heat exchangers. As soon as the oven is turned off the oil will already be up to temperature and will circulate and will heat up the inner core that will be in the engaged position—it will in effect work in reverse to absorb the heat. The shunt will disengage and the heat will be stored in the vacuum chamber. The oil matrix can be diverted to pre-heat the main system/appliance's cold water inlet (suitably that located under the sink). It can be heated by the shunt engaging thereby transferring the stored heat to warm the cold water inlet on the main system—so it can pre heat the water for general hot water tap use or timed to operate when the dish washer or washing machine operate.

The invention is not limited to the embodiments above-described and features of any of the embodiments may be employed separately or in combination with features of the same or a different embodiment and all combinations of features to produce an appliance within the scope of the invention.

What is claimed is:

1. A liquid heating appliance for heating water or other liquids or steam and which comprises: a primary heat storage chamber or body that is thermally insulated and which in use contains or comprises a heat storing liquid or solid; and a secondary chamber adjacent the primary heat storage chamber or body through which a liquid or steam to be heated is passed in use, the appliance having a heat transfer feature to selectively transfer thermal energy from the heat storing liquid or solid of the primary heat storage chamber or body to the liquid or steam to be heated in the secondary chamber, wherein the secondary chamber is a conduit through which the liquid to be heated is able to flow and wherein the primary heat storage chamber is thermally insulated and shielded by a thermal barrier from conductive direct heat transfer relationship with the secondary chamber and the thermal barrier comprises a vacuum gap chamber, and wherein the heat transfer feature comprises a mechanism that moves a surface on the primary heat chamber or body and a surface on the secondary chamber relative to each other to move together to be contacting or in intimate proximity with each other for thermal energy transfer or to move apart.

2. The liquid heating appliance as claimed in claim 1, wherein the heat transfer feature moves within the vacuum gap chamber between the primary heat storing body or chamber and the secondary chamber and selectively operates to thermally bypass the thermal barrier defined by the vacuum gap chamber.

3. The liquid heating appliance as claimed in claim 1, wherein the mechanism comprises a drive piston and/or a worm drive.

4. The liquid heating appliance as claimed in claim 1 wherein the mechanism moves the primary heat storing chamber or body or a part thereof upwardly and the appliance comprises a spring or counter-balance to reduce the energy required to move the primary heat storing chamber or body or part thereof upwardly.

5. The liquid heating appliance as claimed in claim 1, wherein the primary heat storing chamber or body is a body and the body is a solid mass.

6. The liquid heating appliance as claimed in claim 1, wherein the primary heat storage chamber or body and the secondary chamber are configured one with a male surface and the other with a female surface to inter-fit.

7. The liquid heating appliance as claimed in claim 1, wherein the heat transfer feature is automated or controlled by a controller to move between an inoperative state where it does not bridge to the secondary chamber and an operative state where it does bridge to the secondary chamber.

8. The liquid heating appliance as claimed in claim 1, wherein said surface of the primary heat storage chamber or body and said surface of the secondary chamber are mating curved or conical surfaces that inter-fit.

9. The liquid heating appliance as claimed in claim 1, wherein the secondary chamber surrounds the primary heat storage chamber or body as an annulus.

10. The liquid heating appliance as claimed in claim 9, wherein the secondary chamber fully encapsulates the primary heat storage chamber or body.

11. The liquid heating appliance as claimed in claim 1, wherein the secondary chamber comprises a pipe or conduit that coils tightly in a spiral around a perimeter of the vacuum gap.

12. The liquid heating appliance as claimed in claim 11, wherein the secondary chamber is a twin walled sheath that incorporates between the twin walls a matrix of one or more pipes, ducts or conduits and that extends around a perimeter of the vacuum gap chamber that surrounds the primary heat storage chamber or body.

13. The liquid heating appliance as claimed in claim 12, wherein the or each of the one or more said pipes, ducts or conduits spirals both up and down the appliance for additional heat transfer.

14. The liquid heating appliance as claimed in claim 1, wherein, the heat transfer feature for selectively transferring thermal energy from the primary heat storage chamber or body to the secondary chamber of the appliance comprises a heat exchanger between the primary heat storage chamber and the liquid in the secondary chamber.

15. The liquid heating appliance as claimed in claim 1, wherein the appliance has a processor or controller operatively linked thereto that is programmed to control the appliance.

16. The liquid heating appliance as claimed in claim 15, wherein the processor or controller is programmed with one or more predictive algorithms to predict and thence control the appliance to manage operation of the appliance's storing or release of energy and minimise demand spikes or enable the appliance to be operated to release heat for predicted demand.

17. The liquid heating appliance as claimed in claim 15, wherein the processor or controller is programmed to control the appliance to manage operation of the appliance's use of energy to be pre-heated when surplus electrical energy from renewable sources is available and in doing so reconciles how long it can store the energy and when it predicts the appliance will next need to be used.

18. The liquid heating appliance as claimed in claim 16, wherein the processor or controller is programmed to control the appliance to manage operation of the appliance to serve as a store of energy in thermal form and to release the energy in managed amounts and when required.

19. The liquid heating appliance as claimed in claim 16, wherein the processor or controller is operatively linked to a sensor that senses the temperature of the primary heat storage chamber or body or surrounding vacuum gap chamber.

20. The liquid heating appliance as claimed in claim 1, wherein the processor communicates with household appliances or electrical appliances on a common local mains electric power supply whose activation or power consumption levels are discretionary and the processor will control whether the household appliances/electrical appliances turn on or off or increase or decrease power use dependent on both the amount of energy stored in the appliance that will be a factor of the temperature of the primary heat storing chamber or body or the surrounding inner vacuum gap chamber and also the forecast weather conditions of the next few days that will predict the level of both on site and off site renewable energy sources that can be harvested and stored in the system.

21. The liquid heating appliance as claimed in claim 1, wherein the appliance when required boils water to form steam and which is delivered to a steam turbine to generate electricity.

* * * * *